(12) United States Patent
Balsamo et al.

(10) Patent No.: US 8,452,564 B2
(45) Date of Patent: May 28, 2013

(54) METHOD OF DETERMINING GEOMETRIC ERRORS IN A MACHINE TOOL OR MEASURING MACHINE

(75) Inventors: Alessandro Balsamo, Turin (IT); Michele Verdi, Rivoli (IT)

(73) Assignees: Hexagon Metrology S.p.A., Moncalieri (IT); Istituto Nazionale di Ricerca Metrologica (I.N.RI.M.), Turin (IT)

( * ) Notice: Subject to any disclaimer, the term of this patent is extended or adjusted under 35 U.S.C. 154(b) by 306 days.

(21) Appl. No.: 12/117,907

(22) Filed: May 9, 2008

(65) Prior Publication Data

US 2009/0024343 A1    Jan. 22, 2009

(30) Foreign Application Priority Data

May 10, 2007    (IT) ................. TO2007A0318

(51) Int. Cl.
*G01B 11/14* (2006.01)
*G01B 9/02* (2006.01)
*G01D 18/00* (2006.01)
*G06F 19/00* (2006.01)
*G06F 17/40* (2006.01)

(52) U.S. Cl.
USPC .............. 702/95; 33/503; 73/1.79; 73/865.9; 356/498; 356/614; 702/159; 708/200

(58) Field of Classification Search
USPC ................. 702/95, 1, 85, 86, 87, 88, 94, 104, 702/105, 127, 150, 151, 152, 155, 158, 159, 702/187, 189; 33/501, 503; 73/1.01, 1.79, 73/865.9; 356/450, 496, 498, 500, 614, 900; 700/1, 11, 12, 13, 56, 60, 90, 95, 117, 159, 700/186, 187, 188, 189, 190, 191, 192, 193, 700/194, 195, 302; 708/100, 105, 200
See application file for complete search history.

(56) References Cited

U.S. PATENT DOCUMENTS 2,462,292 A * 2/1949 Snyder, Jr. ............... 356/450
2,571,937 A * 10/1951 Peck ........................ 356/326

(Continued)

FOREIGN PATENT DOCUMENTS

GB      2020845 A   * 11/1979
GB      2069169 A   *  8/1981
WO   WO 2005/019769 A1 *  9/1994

OTHER PUBLICATIONS

R. Hocken et al, "Three Dimensional Metrology", Annals of the CIRP Feb. 26, 1977; pp. 403-408.

(Continued)

*Primary Examiner* — Edward Cosimano
(74) *Attorney, Agent, or Firm* — Orrick Herrington & Sutcliffe, LLP

(57) ABSTRACT

Disclosed is a method of determining geometric errors in a machine tool or measuring machine having a mobile unit for moving a target within a measuring volume. The method includes the steps of generating a succession of laser beams in different directions by means of an interferometer, and, for each direction, moving the target into a number of points along the beam; measuring, by means of the interferometer, the abscissa of each of the points from an origin located along the direction of the beam; acquiring the coordinates of each of the points by means of the machine; and determining error parameters of the machine on the basis of the abscissas measured by the interferometer, and the coordinates of the points acquired by the machine.

9 Claims, 1 Drawing Sheet

U.S. PATENT DOCUMENTS

| | | | | |
|---|---|---|---|---|
| 3,884,580 | A | * | 5/1975 | Webster et al. ............... 356/500 |
| 4,261,107 | A | * | 4/1981 | Coleman et al. ............. 250/550 |
| 4,884,889 | A | * | 12/1989 | Beckwith, Jr. ................ 356/620 |
| 4,896,032 | A | * | 1/1990 | Ball et al. ....................... 250/251 |
| 4,939,678 | A | * | 7/1990 | Beckwith, Jr. .................. 702/95 |
| 4,945,501 | A | * | 7/1990 | Bell et al. ......................... 702/95 |
| 5,387,969 | A | * | 2/1995 | Marantette ................... 356/4.09 |
| 6,519,043 | B1 | * | 2/2003 | Wang ............................. 356/614 |
| 6,847,908 | B2 | * | 1/2005 | Chawla ......................... 702/105 |
| 7,171,320 | B2 | * | 1/2007 | Ogura et al. .................... 702/95 |
| 2008/0106714 | A1 | * | 5/2008 | Okita ............................... 355/53 |

OTHER PUBLICATIONS

A. Balsamo, "Effects of Arbitrary Coefficients of CMM Error Maps on Probe Qualification", Annals of the CIRP vol. 44/1/1995; pp. 475-478.

\* cited by examiner

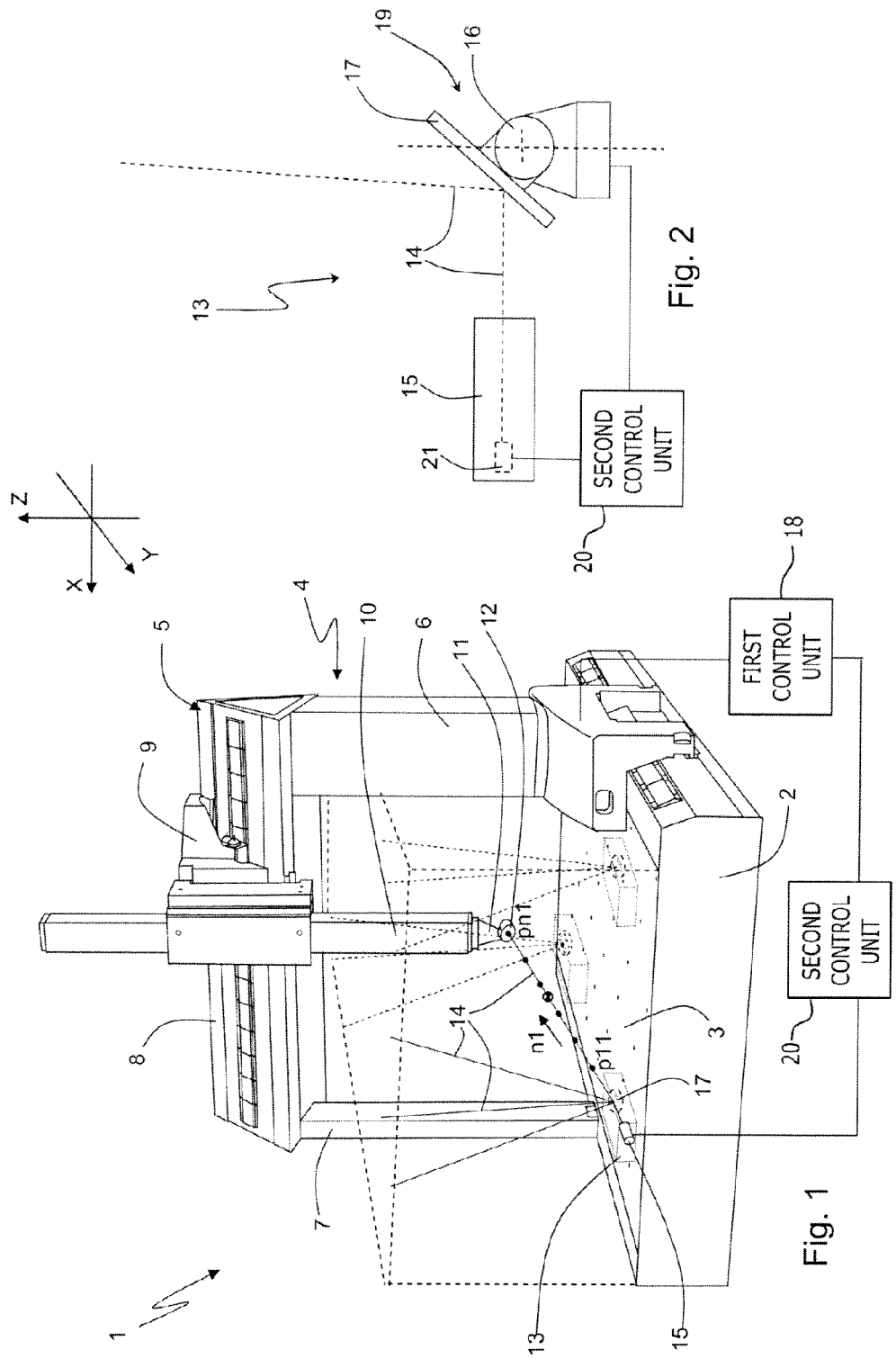

METHOD OF DETERMINING GEOMETRIC ERRORS IN A MACHINE TOOL OR MEASURING MACHINE

This application claims all rights of priority to Italian Patent Application No. IT TO2007A000318, filed May 10, 2007, which is hereby incorporated by reference.

The present invention relates to a method of determining geometric errors in a machine tool or measuring machine.

The invention preferably, though not exclusively, applies to measuring machines, to which the following description refers for the sake of clarity, but purely by way of example.

BACKGROUND OF THE INVENTION

One method of determining geometric errors in machines is known from WO2005/019769, in which the machine is operated to move a back-reflector within the measuring volume along a three-dimensional grid oriented with respect to the coordinate axes, and successive grid points are acquired. The reflector is tracked by an optical tracking device or "laser tracer" located on the machine bed and comprising an interferometer; the actual distance between each acquired grid point and a predetermined reference point associated with the laser source is measured interferometrically; as is known, this distance can be determined short of the dead path of the interferometer, which is unknown.

The same sequence of operations is performed with the tracer laser in different positions on the measuring machine bed.

On the basis of a kinematic model of the machine, the acquired-point coordinates and the distances measured by the interferometer are processed to calculate error parameters of the machine.

The known method described briefly above has the drawback of requiring an extremely precise, and therefore complex, high-cost, laser tracer capable of making continuous interferometric measurements alongside variations in orientation of the laser beam.

Moreover, for each position of the laser tracer, it introduces additional unknowns in the form of the dead path of the interferometer, and the laser tracer position.

SUMMARY OF THE INVENTION

It is an object of the present invention to provide a method of determining geometric errors in a cartesian machine, designed to eliminate the aforementioned drawbacks typically associated with known methods.

According to the present invention, there is provided a method as claimed in the attached Claims.

BRIEF DESCRIPTION OF THE DRAWINGS

A preferred, non-limiting embodiment of the invention will be described by way of example with reference to the accompanying drawings, in which:

FIG. 1 shows a measuring machine and an interferometer measuring device operating in accordance with the method;

FIG. 2 shows the FIG. 1 interferometer measuring device.

DETAILED DESCRIPTION OF THE INVENTION

Number 1 in FIG. 1 indicates as a whole a measuring machine comprising a flat bed 2 with a horizontal reference plane 3 parallel to two horizontal axes X, Y of a set of three Cartesian axes X, Y, Z, and for supporting an object (not shown) to be measured; and a mobile unit 4.

Unit 4 comprises a bridge 5 movable along axis Y with respect to bed 2, and in turn comprising two uprights 6 and 7, and a cross member 8 extending between uprights 6 and 7 and parallel to axis X.

Unit 4 also comprises a carriage 9 fitted to and movable on cross member 8 along axis X; and a measuring head 10 fitted to and movable with respect to carriage 9 along axis Z.

The bottom end of head 10 is conveniently fitted with a known two-axis articulation device 11 for orientably supporting a probe (not shown) in use, and which conveniently comprises a two-axis "wrist" with a vertical axis A, i.e. parallel to axis Z, and a horizontal axis B, i.e. parallel to plane XY.

To determine geometric errors of machine 1 according to the method of the present invention, the articulation device is fitted with a target comprising a back-reflector 12, which may be of any known type, e.g. a cat's eye or corner cube.

The method according to the present invention is also implemented using an interferometer measuring device 13, i.e. an instrument capable of generating and orienting a laser beam 14 along a direction that is variable with two degrees of rotational freedom (azimuth and elevation), and for interferometrically determining the abscissa, with respect to a predetermined origin, of a back-reflector positioned along such direction.

Device 13 (FIG. 2) conveniently comprises a known commercial interferometer 15; and a beam deflector 19 with two degrees of freedom. Beam deflector 19 may be defined by a known indexing head 16 fitted with a mirror 17 which receives the laser beam 14 generated by interferometer 15, and reflects it along a direction defined by the orientation of mirror 17.

According to the method of the invention, device 13 is set successively to different positions within the measuring volume of machine 1; and, in each position of device 13, laser beams 14 are generated successively along different directions, each indicated hereinafter by a variable index j.

The number of successive positions of device 13 within the measuring volume, and the number and directions of the laser beams generated from each position, are conveniently selected to cover the whole measuring volume, as explained in more detail below.

Machine 1 is equipped with a first control unit 18 for controlling the electric motors (not shown) driving the moving components 5, 9, 10 of the machine along the respective coordinate axes, and which also acquires and memorizes, in use, the coordinates acquired by the probe.

Device 13 is controlled by a second control unit 20 for orienting laser beam 14 along a predetermined direction, and which may be incorporated in first control unit 18, if this is designed for it, or may communicate with first control unit 18 for synchronization purposes.

Device 13 conveniently comprises a photoreceiver 21 for generating a signal depending on the intensity of the return laser beam from the back-reflector. Photoreceiver 21 is conveniently connected by second control unit 20 to first control unit 18, to enable this to move back-reflector 12 along the direction of the beam by feedback control on the basis of said signal.

One example of the way in which the method according to the present invention is implemented is described below.

After setting device 13 to a first position within the measuring volume, a first laser beam 14 is generated along a first direction (j=1) defined by unit vector $n_1$.

Machine 1 is then operated to set back-reflector 12 to a succession of points $P_{i1}$ along the direction of the beam. For each point, the vector $P_{i1}$ (u) is acquired, the components of which are the point coordinates acquired by machine 1 and containing errors due to error parameters u (unknown), and the abscissa $l_{i1}$ of each point, with respect to an origin, measured interferometrically and which may be assumed accurate. The origin may be selected arbitrarily along the direction of the beam, and in actual fact is set by zeroing the counter of the interferometer in device 13.

Each point whose abscissa is measured by device 13 is aligned along a line defined by unit vector $n_1$, and may be represented in a reference system integral with the device by accurate vector $l_{i1}=l_{i1}n_1$.

To compare vector $l_{i1}$ with the corresponding $P_{i1}$ measured by machine 1 in its machine-axis reference system, both must be expressed in the same reference system, which is done by rotation-translation defined by an unknown rotation matrix $R_1$ and translation vector $t_1$.

The device is then set to a number of successive positions j, for each of which, the same procedure described for position j=1 is repeated.

Error parameters u may then be calculated by minimizing, with respect to them, to rotation matrixes $R_j$, and to translation vectors $t_j$, the error function defined by the sum of the differences, for each point, between vector $P_{ij}(u)$ (affected by error) and rotated-translated vector $l_{ij}$ in the reference system of machine 1:

$$\min_{u,R_j,t_j} \sum_{ij} \|P_{ij}(u) - R_j l_{ij} - t_j\|^2 \quad (1)$$

where:

$P_{ij}(u)$ represents the machine coordinates of the i-th point on the j-th laser beam, depending on error parameters u;

$l_{ij}$ represents the coordinates of the points whose abscissas, with respect to a common origin, are acquired by the device, in the reference system integral with it;

$R_j$ and $t_j$ represent, respectively, the rotation matrix and the translation vector by which to convert vectors $l_{ij}$ to the machine reference system (N.B. there is one matrix $R_j$ and one vector $t_j$ for each direction j of the laser beam).

Assuming small angles about initial approximations of $R_j$, obtainable directly from the coordinates acquired by machine 1, the problem is one of separable variables, and the rotation-translations ($R_j$, $t_j$) can be estimated separately beforehand. These solutions bring each line j of beam 14 to coincide with the least squares line for corresponding points $P_{ij}$, and the barycentres of points $l_{ij}$ to coincide with the corresponding barycentres of points $P_{ij}$. So that (1) is reduced to $$\min_{u} \sum_{ij} [n_j^T(P_{ij} - \overline{P_j}) - (l_{ij} - \overline{l_j})]^2 \quad (2)$$

where:

$n_j$ represents the unit vector of the least squares line j calculated on the basis of points $P_{ij}$;

$\overline{P_j}$ represents the barycentre of the points acquired by the machine along the j-th laser beam, i.e. their mean value;

$\overline{l_j}$ represents the mean value of the abscissas acquired by device 13 along the j-th laser beam.

(2) minimizes the sum of the differences between the projections of the machine readings onto the respective direction j, and the corresponding abscissas acquired by the device.

Points $P_{ij}$ are then represented as a function of machine error parameters u by means of a kinematic model:

$$P_{ij}(u)=\dot{P}_{ij}+e_{ij}(P_{ij},p_{ij},u) \quad (3)$$

where:

$\dot{P}_{ij}$ represents the position of point $P_{ij}$ in the absence of geometric machine errors;

$e_{ij}$ is the geometric machine error as a function, not only of error parameters u, but also the position in the measuring volume $P_{ij}$ and the offset $P_{ij}$ of the probe or tool.

The kinematic model expressed in (3) must fit the kinematics of the specific machine considered. Some kinematic models applicable to classes of machines are known in literature. By way of a non-limiting example, the rigid-body kinematic model (Hocken, R., Simpson, J., Borchardt, B., Lazar, J., Stein, P., 1977, *"Three dimensional metrology"*, Annals of the CIRP 26/2/1977:403-408; formulation subsequently modified in Balsamo, A., 1995 *"Effects of arbitrary coefficients of CMM error maps on probe qualification"*, Annals of the CIRP 44/1/1995:475-478) represents machine errors as:

$$e=t_x+t_y+t_z+r_x\hat{}h_x+r_y\hat{}h_y+r_z\hat{}h_z \quad (4)$$

where $t_x$, $t_y$, $t_z$ are vectors expressing translation errors (three components per axis):

$$t_x = \begin{pmatrix} t_{xx} \\ t_{xy} \\ t_{xz} \end{pmatrix} \quad (5)$$

$$t_y = \begin{pmatrix} t_{yx} \\ t_{yy} \\ t_{yz} \end{pmatrix}$$

$$t_z = \begin{pmatrix} t_{zx} \\ t_{zy} \\ t_{zz} \end{pmatrix}$$

$r_x$, $r_y$, $r_z$ are vectors expressing rotation errors (three components per axis):

$$r_x = \begin{pmatrix} r_{xx} \\ r_{xy} \\ r_{xz} \end{pmatrix} \quad (6)$$

$$r_y = \begin{pmatrix} r_{yx} \\ r_{yy} \\ r_{yz} \end{pmatrix}$$

$$r_z = \begin{pmatrix} r_{zx} \\ r_{zy} \\ r_{zz} \end{pmatrix}$$

$h_x, h_y, h_z$ are Abbe arms, perpendicularly to which rotation occurs:

$$h_x = \begin{pmatrix} 0 \\ y \\ z \end{pmatrix} + p \quad (7)$$

$$h_y = \begin{pmatrix} 0 \\ 0 \\ z \end{pmatrix} + p$$

$$h_z = p$$

$\hat{}$ is the vector product symbol.

This model has 18 error functions, one for each component of vectors $t_x$, $t_y$, $t_z$ and $r_x$, $r_y$, $r_z$, and which may be expressed in either tabular or analytical form (by linear or polynomial interpolations, harmonic or exponential expansions, etc.). In the case of tabular representation, unknown error parameters u are defined by function values acquired at appropriate sampling intervals; in the case of polynomial representation, error parameters u are defined by the coefficients of the various degrees of the polynomial; and, in the case of harmonic or exponential series representation, by the coefficients of the series.

By inserting (5), (6), (7) in (4), the latter in (3), and, finally, the latter in (2), minimization can be performed and unknown parameters u determined.

As is known to one skilled in the art, e.g. from the second of the above publications, minimization involves imposing constraints to eliminate arbitrary degrees of freedom related to the arbitrary location in the machine space of the ideal reference system with respect to which geometric errors are evaluated. These degrees of freedom would otherwise prevent algorithmic execution and result in singularity in the calculations. More specifically, the rigid-body model has 21 degrees of freedom requiring constraint by as many equations:

$$Cu = 0 \quad (8)$$

where C is the constraint matrix having 21 lines, and the same number of columns as error parameters u.

By way of example, and with reference to a tabular error function representation, the above arbitrary parameters may be set as follows.

A 0 barycentre is imposed for each error function:

$$\sum_k u_{hk} = 0, \quad (9)$$

where h identifies the error function (h=1, ..., 18), and k the specific table value.

This gives 18 constraints, leaving three, relative to orientation of the corrected system axes with respect to the machine axes. More specifically, imposing mean parallelism of the respective X axes and XY planes of the corrected system and the machine system gives the three equations:

$$\sum_k (\xi_{hk} - \bar{\xi}_h) u_{hk} = 0 \quad (10)$$

where:

h indicates the three straightness functions $t_{xy}$, $t_{xz}$ or $t_{yz}$;

$\xi$ indicates the current coordinate of the respective function h, i.e. x, x or y respectively;

$\xi_{hk}$ indicates the abscissa of the sample points along the axis;

$\bar{\xi}_h$ indicates the mean value of the abscissas of the sample points along the axis.

Once the above constraints are imposed, (2) can be resolved, and error parameters u of the kinematic model determined.

To determine the error parameters more accurately, the above should be repeated for more than the theoretical minimum number of positions of device 13.

Moreover, for each position of device 13, the greater the number of acquisitions along each direction of the beam, and the greater the number of directions, the greater the accuracy with which the error parameters are determined.

Finally, to determine all the error functions, the back-reflector must be mounted with different offsets. For a complete series of acquisitions along a direction of beam 14, the offset is conveniently maintained constant, to avoid measuring uncertainty caused by spatial anisotropy of the back-reflector and determination of the orientation angles of the articulation device. Different offsets may be employed for acquisitions along different directions, or for repeat acquisitions along the same direction.

Purely by way of example, 100 acquisitions may reasonably be performed for 25 different beam directions and three different positions of the device in the measuring volume.

Very briefly, the actual procedure by which to implement the method according to the invention may be as follows.

Device 13 is set to a first position in the measuring volume.

Laser beams are then generated successively along different directions to cover as wide a solid angle as possible; for each beam direction, machine 1 is operated to move back-reflector 12 along beam 14; and points along the direction of the beam are acquired simultaneously by device 13 and machine 1.

First control unit 18 therefore memorizes both machine coordinates $x_i$, $y_i$, $z_i$ and values $l_i$ in a special table which may, for example, be of the type shown below:

| $l_1$ | $x_1$ | $y_1$ | $z_1$ |
| $l_2$ | $x_2$ | $y_2$ | $z_2$ |
| ... | ... | ... | ... |
| $l_n$ | $x_n$ | $y_n$ | $z_n$ |
| $\bar{l}$ | $\bar{x}$ | $\bar{y}$ | $\bar{z}$ |

The mean value $\bar{l}$ of the device 13 readings, and the mean value of machine coordinates $\bar{x}$, $\bar{y}$, $\bar{z}$ are calculated on the basis of the memorized values.

And the above operation is repeated for all the laser beam directions, in all the positions of device 13.

Once the data is acquired, the error parameters of the machine are calculated using the mathematical method described above, and are memorized in first control unit 18 for future measurement compensation using equation (4).

The advantages of the method of determining geometric errors of a measuring machine according to the present invention will be clear from the foregoing description.

By measuring along one direction at a time, i.e. with no rotation of the laser beam during the measurement, a straightforward device can be used, with no back-reflector tracking capability or particularly high angular aiming precision. The fine-positioning capability of the machine, in fact, is what actually tracks the beam direction, while changes in angular position are made when measurement by the interferometer is suspended, and so have no effect on the measurement. Moreover, the measured points all being aligned along one direction, determining the unknown rotation-translation necessary to convert the device measurements to the machine reference system is simplified, and amounts to simply calculating the least squares line of the measured points in the ordinary way. Moreover, locating the origin of the system at the barycentre of the measured points eliminates at the outset the need to determine the position and dead path of the interferometer.

Clearly, changes may be made to the embodiment of the present invention as described herein without, however, departing from the scope defined in the accompanying Claims.

In particular, in addition to bridge types, the method according to the invention may be applied to any type of measuring machine, e.g. horizontal-arm, column, and even articulated-robot machines, and also for correcting geometric errors of machine tools.

Though the preferred embodiment of the method employs an interferometer measuring device, other techniques may be used to acquire the abscissas along the different directions, e.g. a step gauge oriented by an automatic actuating system covering the main axes (3 axial, 4 volumetric, diagonal of the coordinate planes) and capable of translating along a direction to cover the whole measuring line. The gauge may be measured with different tool offsets to also identify otherwise unobtainable error functions.

Alternative methods, such as conventional wire and reel systems, may also be employed.

Finally, the abscissas along the various measuring axes may be acquired using a system comprising a laser source optical-fibre-connected to an indexing head.

What is claimed is:

1. A method of determining geometric errors in a machine tool or measuring machine comprising a mobile unit for moving a target within a measuring volume, the method comprising the steps of:
    setting an interferometer measuring device in at least one fixed position in the measuring volume, the interferometer measuring device including a laser interferometer and a reflector controlled by an actuating device for deflecting a laser beam generated by said laser interferometer;
    setting a laser beam generated by the laser interferometer along a direction within the measuring volume by means of said deflector;
    moving the target into a number of discrete points along said direction by means of the mobile unit while keeping said direction fixed;
    measuring, by means of the interferometer, the abscissa of each of said points from an origin located along said direction;
    acquiring the coordinates of each of the points by means of said machine;
    repeating the foregoing steps for a number of directions within the measuring volume, said directions being defined by deflecting the laser beam, generated by said interferometer, by means of said reflector controlled by said actuating device, while keeping said interferometer measuring device in said fixed position; and
    determining error parameters of said machine on the basis of the abscissas measured by the measuring device and the coordinates of the points acquired by said machine.

2. The method of claim 1, wherein said origin is the barycentre of the points measured by the measuring device along said direction.

3. The method of claim 1, characterized in that said target is a back-reflector.

4. A method as claimed in claim 1, comprising at least two steps of acquiring points along two different directions; said target being mounted on said mobile unit with different offsets for the two steps.

5. The method of claim 1, including the step of setting said interferometer measuring device in a number of different fixed positions within said measuring volume and, while maintaining said interferometer measuring device in each position,
    setting the laser beam generated by the laser interferometer along a direction within the measuring volume by means of said deflector;
    moving the target into a number of discrete points along said direction by means of the mobile unit while keeping said direction fixed;
    measuring, by means of the interferometer, the abscissa of each of said points from an origin located along said direction;
    acquiring the coordinates of each of the points by means of said machine;
    repeating the foregoing steps for a number of directions within the measuring volume, said directions being defined by deflecting the laser beam, generated by said interferometer, by means of said reflector controlled by said actuating device, while keeping said interferometer measuring device in said fixed position; and
    determining error parameters of said machine on the basis of the abscissas measured by the measuring device and the coordinates of the points acquired by said machine for each direction of the laser beam and in each position of the interferometer measuring device.

6. A method as claimed in claim 1, wherein at last a plurality of said directions of the laser beam are not aligned to the machine axes.

7. The method of claim 1, wherein the step of determining error parameters comprises, for each said direction, the step of determining a line approximating the succession of points on the basis of the coordinates acquired by said machine; and imposing that said line lies along said direction.

8. The method of claim 7, wherein said step of determining error parameters comprises the step of imposing that the barycentre of the points calculated on the basis of the coordinates acquired by said machine coincides with the barycentre of the points calculated on the basis of the abscissas measured by the measuring device.

9. The method of claim 7, wherein said step of determining error parameters comprises the step of minimizing the sum of the differences between the projections of each point acquired by the machine onto said direction and the abscissas acquired by said measuring device.

* * * * *